Patented June 30, 1931

1,812,531

UNITED STATES PATENT OFFICE

PAUL HÖFER, OF BERLIN, GERMANY

PRODUCING POTASSIUM NITRATE

No Drawing. Application filed June 17, 1929, Serial No. 371,706, and in Germany July 26, 1927.

My invention refers to reactions between nitrates and chlorides and more especially between the nitrates of readily hydrolyzable metals, for instance aluminium or iron, with potassium chloride for the purpose of forming potassium nitrate and the chlorides of aluminium or iron.

According to the present invention potassium chloride is introduced under stirring into a hot solution of aluminium nitrate or, vice versa, aluminium nitrate is introduced into a hot solution of potassium chloride. The solution is allowed to cool whereupon potassium nitrate separates out. After removal of the potassium nitrate, the mother liquor, which is substantially saturated with potassium chloride and aluminium chloride, is concentrated by evaporation, accompanied by the escape of hydrochloric acid gas, until nitrous gases are being developed. To the liquor, concentrated by evaporation, are added quantities, equivalent to the quantity of hydrochloric acid which escaped, of nitric acid and potassium chloride, the evaporated water being at the same time replaced, so that after the separation of potassium nitrate the original concentration is restored. After cooling of this solution another quantity of potassium nitrate, corresponding to the quantity of potassium chloride added to the solution, will separate out. In this manner the mother liquor is always returned into the operation so that all losses of potassium and nitrogen are avoided.

I have found, that it is not necessary to operate at elevated temperature, the conversion taking place also if the nitrate is made to act on potassium chloride in the presence of the corresponding quantity of water in the cold. In this case a mother liquor of the concentration mentioned above is obtained also.

Instead of adding nitric acid, I may also add nitrous gases.

I may, however, also proceed in such manner that after hydrochloric acid gas free from NO has been expelled and the percentage of nitrogen oxides in the escaping gases gradually increases, the solution is heated further, until a substantial part of the chlorine has escaped, whereupon such quantities of potassium chloride, nitric acid and water are added, that after a new quantity of potassium nitrate has been separated out, the original concentration of the liquor is restored, whereupon this liquor is once more evaporated, etc.

In this manner the yield of potassium nitrate is greatly increased.

The escaping gases (HCl, chlorine, nitrosyl chloride and nitrogen oxides) are separated in a well known manner.

*Example 1.*—To a solution of 426 grams $Al(NO_3)_3$ in 900 grams water are added 448 grams KCl. Under permanent stirring the solution is gradually heated to 115° C., whereby the KCl is entirely dissolved. The solution is now allowed to cool down to 20° C. There are separated out coarse crystals of $KNO_3$, which are separated by filtering under suction and are slightly washed with cold water. In this manner 430 grams $KNO_3$ of extreme purity are obtained. The mother liquor having a specific weight of 1.313 is now treated as follows: From 1000 grams of the liquor heated under stirring to 115° C. 400 grams water are removed by evaporation. At the same time 13.5 grams HCl escape in consequence of hydrolytic action. To the hot solution are now added 400 grams water, 23.3 grams $HNO_3$ and 27.6 grams KCl. When the solution has cooled down to 20° C., 37.5 grams $KNO_3$ separate out, which are removed by suction and slightly washed with cold water, 35 grams of purest potassium nitrate being thus obtained. The wash water is added to the concentrated mother liquor, which is treated further as above described.

*Example 2.*—A solution of aluminium nitrate and potassium chloride, prepared as described with reference to Example 1, is treated in the same manner as above described, however instead of 400 grams water 420 grams are evaporated per 1000 grams of the mother liquor. In this case 43.8 grams HCl and 45.1 grams $HNO_3$ are distilled off, partly in the form of nitrosyl chloride and chlorine. To make up for the quantities of hydrochloric and nitric acids removed by distillation there are added to the hot liquor 420 grams water, 120.8 grams HNO₃ and 89.5 grams KCl. When the solution has cooled down to 20° C., 122 grams KNO₃ separate out, and after filtering and washing with some cold water 117 grams purest potassium nitrate are obtained. The wash water is added to the mother liquor, the mixture of hydrochloric and nitric acids is freed from chlorine in a well known manner and also added to the mother liquor.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. The method of producing potassium nitrate comprising acting on a nitrate of a readily hydrolyzable metal with potassium chloride by adding one of these salts to a hot solution of the other salt, allowing the mixture to cool to separate potassium nitrate, removing same, evaporating the liquor and developing hydrochloric acid gas, adding water, potassium chloride and a nitrogen oxide to restore the original composition of the solution, and proceeding further as in the original operation.

2. The method of producing potassium nitrate comprising acting on aluminium nitrate with potassium chloride by adding one of these salts to a hot solution of the other salt, allowing the mixture to cool to separate potassium nitrate, removing same, evaporating the liquor and developing hydrochloric acid gas, adding water, potassium chloride and a nitrogen oxide to restore the original composition of the solution, and proceeding further as in the original operation.

3. The method of producing potassium nitrate comprising acting on a nitrate of a readily hydrolyzable metal with potassium chloride by adding one of these salts to a hot solution of the other salt, allowing the mixture to cool to separate potassium nitrate, removing same, evaporating the liquor and developing hydrochloric acid gas, adding water, potassium chloride and nitric acid to restore the original composition of the solution, and proceeding further as in the original operation.

4. The method of producing potassium nitrate comprising acting on aluminium nitrate with potassium chloride by adding one of these salts to a hot solution of the other salt, allowing the mixture to cool to separate potassium nitrate, removing same, evaporating the liquor and developing hydrochloric acid gas, adding water, potassium chloride and nitric acid to restore the original composition of the solution, and proceeding further as in the original operation.

5. The method of producing potassium nitrate comprising acting on a nitrate of a readily hydrolyzable metal with potassium chloride by adding one of these salts to a hot solution of the other salt, allowing the mixture to cool to separate potassium nitrate, removing same, evaporating the liquor and developing hydrochloric acid gas and nitrous gases, until the greater part of the chlorine has escaped, adding water, potassium chloride and a nitrogen oxide to restore the original composition of the solution, and proceeding further as in the original operation.

In testimony whereof I affix my signature.

PAUL HÖFER.